(12) United States Patent
Bommasamudram et al.

(10) Patent No.: US 10,740,207 B2
(45) Date of Patent: Aug. 11, 2020

(54) CAPTURING AND COMPARING DATABASE PERFORMANCES ACROSS PLATFORMS

(71) Applicants: Vinod Kumar Bommasamudram, Bangalore Karnataka (IN); Murthy Naik Revananaik, Bangalore Karnataka (IN); Charan Priyadarsi Khuntia, Bangalore Karnataka (IN)

(72) Inventors: Vinod Kumar Bommasamudram, Bangalore Karnataka (IN); Murthy Naik Revananaik, Bangalore Karnataka (IN); Charan Priyadarsi Khuntia, Bangalore Karnataka (IN)

(73) Assignee: Unisys Corporation, Blue Bell, PA (US)

( * ) Notice: Subject to any disclaimer, the term of this patent is extended or adjusted under 35 U.S.C. 154(b) by 506 days.

(21) Appl. No.: 15/064,742

(22) Filed: Mar. 9, 2016

(65) Prior Publication Data
US 2017/0206230 A1 Jul. 20, 2017

(51) Int. Cl.
*G06F 11/34* (2006.01)
(52) U.S. Cl.
CPC .............................. *G06F 11/3409* (2013.01)

(58) Field of Classification Search
CPC .................................................. G06F 11/3409
USPC ......................................................... 707/609
See application file for complete search history.

(56) References Cited

U.S. PATENT DOCUMENTS

| | | | | |
|---|---|---|---|---|
| 2004/0225632 | A1* | 11/2004 | Benson | G06F 17/30575 |
| 2005/0021567 | A1* | 1/2005 | Holenstein | G06F 11/2097 |
| 2005/0203881 | A1* | 9/2005 | Sakamoto | G06F 21/552 |
| 2005/0289187 | A1* | 12/2005 | Wong | G06F 17/30386 |
| 2007/0150488 | A1* | 6/2007 | Barsness | G06F 17/303 |

* cited by examiner

*Primary Examiner* — Hicham Skhoun

(57) ABSTRACT

Apparatuses, systems, and methods that compare performance indications across platforms. In one embodiment, a method includes importing, by an processor, an audit trail of a host platform. The method includes executing, by the processor, instructions of a replay engine. The method includes executing, by the processor, instructions of a capture engine. The method includes executing, by the processor, instructions of an adaptation engine. The method includes exporting, by the processor, a configuration file to a target platform. The method includes comparing, by the processor, performance indications of the host and the target platforms.

17 Claims, 8 Drawing Sheets

CAPTURING AND COMPARING DATABASE PERFORMANCES ACROSS PLATFORMS

FIELD OF THE DISCLOSURE

The instant disclosure relates generally to database management. More specifically, this disclosure relates to methods, apparatuses, and systems that compare database performance indications across different platforms.

BACKGROUND

A database often runs on more than one platforms, e.g., Windows, Unix, Linux, etc. The performances of executing a task, e.g., read, write, delete, etc, on the database through different platforms are different. For example, to delete a data of a database hosted on Unix may require X amount of time. Yet, to delete a data of a database hosted on Windows may require Y amount of time, wherein Y may be different from X. The embodiments of methods, apparatuses, and systems disclosed herein may provide useful solutions to compare performance indications across platforms.

SUMMARY

The instant disclosure relates generally to database management. More specifically, this disclosure relates to methods, apparatuses, and systems that compare database performance indications across different platforms. According to one embodiment, a method includes importing, by an processor, an audit trail of a host platform. The method includes executing, by the processor, instructions of a replay engine. The method includes executing, by the processor, instructions of a capture engine. The method includes executing, by the processor, instructions of an adaptation engine.

According to another embodiment, a computer program product includes a non-transitory computer-readable medium comprising instructions which, when executed by a processor of a computing system, cause the processor to perform the steps of: importing an audit trait of a host platform, executing instructions of a replay engine, executing instructions of a capture engine; and executing instructions of an adaptation engine.

According to another embodiment, an apparatus comprises a memory and a processor coupled to the memory. The processor is configured to execute the steps of importing an audit trail of a host platform, executing instructions of a replay engine, executing instructions of a capture engine, and executing instructions of an adaptation engine.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the concepts and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed systems and methods, reference is now made to the following descriptions taken in conjunction with the accompanying drawings.

DETAILED DESCRIPTION

Figure 1:
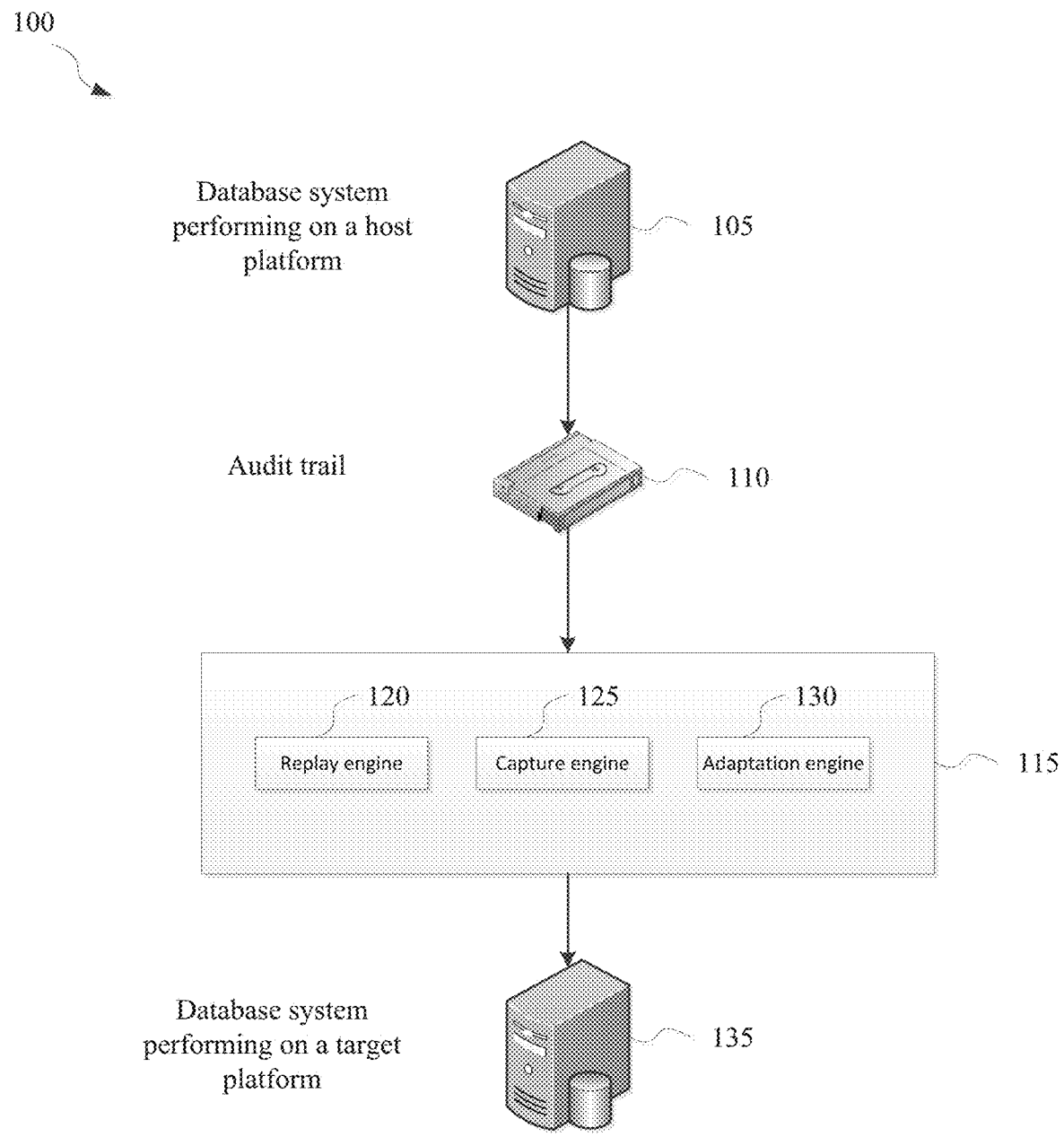
FIG. 1 is a schematic drawing illustrating a system that compares performance indications across different platforms according to one embodiment of the disclosure.

The term "operating system" means a set of instructions that can be executed by a processor of a computer. An operating system supports the basic functionalities of a computer. An operating system may be an emulated operating system or a non-emulated operating system, for example, OS 2200, Eclipse 2200, System Architecture Interface Layer (SAIL), Linux, Windows, Java, Unix, or the like.

The term "instruction" means a processor-executable instruction, for example, an instruction written as programming codes. An instruction may be executed by any suitable processor, for example, x86 processor. An instruction may be programed in any suitable computer language, for example, machine codes, assembly language codes, C language codes, C language codes, Fortran codes, Java codes, Matlab codes, or the like.

A "computer-readable medium" holds the data in a data storage medium for a period of time that is not transient. The term computer-readable medium may be used interchangeably with non-transient computer-readable medium. A computer-readable medium may be volatile memory that loses its memory when power is off, e.g., random access memory (RAM), dynamic random access memory (DRAM), etc. A computer-readable medium may be non-volatile memory that does not lose its memory when power is off, e.g, hard disk, flash memory, optical disk, magnetic tape, etc. Computer-readable medium includes, e.g., random access memory (RAM), dynamic random access memory (DRAM), read only memory (ROM), electrically erasable programmable read-only memory (EEPROM), Flash memory, NAND/NOR gate memory, hard disk drive, magnetic tape, optical disk, compact disk (CD), or the like.

A "database" is a set of data with a certain structure stored in a computer-readable medium. The structure of a database may include columns and rows. The structure of a database may be static or dynamic. Various tasks may be performed on the data stored in a database, e.g., read, write, modify, move, copy, delete, or the like. Various tasks may further include: record insertion into database, database record deletion, database record modification, adding database structure, deleting database structure, modifying database structure, database dump, database online and/or offline reorganization, database recovery, database quiesce, or the like.

A "platform" means an operating system that hosts a database. A platform may be a non-emulated operating system, e.g., Windows, Linux, Unix, or the like. A platform may be an emulated operating system, e.g., OS 2200, Eclipse 2200, System Architecture Interface Layer (SAIL), or the like.

A "host platform" means a platform that hosts a database, from which an audit trail was recorded. In some embodiments, the host platform may be the first platforms in FIGS. 3-5.

A "target platform" means a platform that receives a configuration file. In some embodiments, the target platform may be the second platform in FIG. 5.

An "audit trail" means a detail record of the changes and tasks performed in a database, e.g., read, write, modify, move, copy, delete, or the like. The audit trail may include the identity of the user, the time point each task was started, the time point each task was completed, or the like. The audit trail may also include the data of the database before and after the each task was performed. An audit trail may be stored in the computer-readable medium that hosts the database, e.g., a hard drive of the database server, etc. An audit trail may also be stored in a computer-readable medium separate from the one that hosts the database, e.g., a magnetic tape, a separate hard drive, etc.

A "replay engine" is a system, an apparatus, and/or a set of instructions that is configured to reconstruct a database existed at a certain time point using an audit trail. A replay engine is configured to repeat chronologically the tasks recorded in the audit, trail.

A "replay" is a repeat of the tasks under an environment of a database recorded in an audit trail. A replay is performed by a replay engine. A replay may be used by a capture engine to create a capture file.

A "capture engine" is a system, an apparatus, and/or a set of instructions that is configured to create a capture file based on a replay of a host/first platform. A capture engine is configured to create a database based on the replay. In one embodiment, the database created by a capture engine may be the same as the database existed in the replay. In another embodiment, the database created by a capture engine may be different from the database existed in the replay, e.g., only the parts of the database of which the tasks were performed on (for example read, write, copy, move, delete, etc) are extracted. A capture engine may be configured to extract data from the replay. A capture engine may be configured to store the extracted data to the database created. A capture engine may be configured to collect system information of the host/first platform. A capture engine may be configured to collect performance indications of the host/first platform.

A "capture file" is a file created by a capture engine from a replay. A capture file may include a database created by the capture engine. A capture file may include the data extracted by the capture engine. A capture file may include the system information of the host/first platform. A capture file may include performance indications of the host/first platform. A capture file may be used by an adaption engine to create a configuration file.

An "adaptation engine" is a system, an apparatus, and/or a set of instructions that is configured to create a configuration file from a capture file. The adaptation engine is configured to collect database attributes of a target/second platform, such that the configuration file may be performed on a target/second platform to repeat the same or similar tasks that were performed on a host/first platform. The adaptation engine is configured to import a capture file of a host/first platform.

A "configuration file" is a file created by an adaptation engine from a capture file. A configuration file is a file that allows a target/second platform to repeat the same or similar tasks that were performed on a host/first platform, such that the performance indications of the host/first platform and target/second platform may be compared.

In one embodiment, a configuration file may include part or all information in a capture file of a host/first platform. In another embodiment, a configuration file may include database attributes of a target/second platform. In another embodiment, a configuration file is generated for the purpose of comparing platform performances by performing same or similar tasks across platforms. In one embodiment, the configuration file may be an executable file that can reproduce the database on a target/second platform and repeat the same tasks performed, such that the platform performances across different platforms can be compared.

"Database attributes" may include database structure area size, number of areas, block size, audit file area size, number of records that can be populated to a database, number of buffers, memory resident, tuple storage related information, or the like.

"Platform performances" means the time required to perform a task in a database hosted by the platform. In one embodiment, shorter time required for performing a task indicates better performances. In some embodiments, tasks performed may include read, write data, modify data, move data, copy data, delete data, record insertion into database, database record deletion, database record modification, adding database structure, deleting database structure, modifying database structure, database dump, database online and/or offline reorganization, database recovery, database quiesce, or the like.

In one embodiment, the platform performances may be compared across platforms. For example, X amount of time is required to perform a task in a database hosted in a host/first platform, e.g. Windows. Yet, Y amount of time is required to perform the same task in the same database hosted in a target/second platform, e.g., Unix, Platform performances (e.g., X and Y) can be compared.

"Performance indications" include indications of how a database is performing. Performance indications can be compared across platforms. Performance indications includes platform performances. Performance indications may also include database performance related quantification other than time of execution, e.g., platform performances.

For a more complete understanding of the disclosed systems and methods, reference is now made to the following descriptions taken in conjunction with the accompanying drawings.

FIG. 1 is a schematic drawing illustrating a system 100 that compares performance indications across different platforms according to one embodiment of the disclosure. The system 100 may implement the method 200 in FIG. 2. In one embodiment, the apparatus 115 may implement the method 200. The system 100 may include the method implementing a replay engine 300 in FIG. 3. In one embodiment, the method implementing a replay engine 300 may be an alternative embodiment of the replay engine 120. The system 100 may include the method implementing a capture engine 400 in FIG. 4. In one embodiment, the method implementing a capture engine 400 may be an alternative embodiment of the capture engine 125. The system 100 may include the method implementing an adaptation engine 500 in FIG. 5. In one embodiment, the method implementing an adaptation engine 500 may be an alternative embodiment of the adaptation engine 130. The system 100 may be used as part or in combination with the system 600 in FIG. 6. In one embodiment, the server 602 may be an alternative embodiment of the database system performing on a host platform 105 and/or the database system performing on a target platform 135. The system 100 may include the computer system 700 in FIG. 7. In one embodiment, the computer system 700 may be an alternative embodiment of the database system performing on a host platform 105 and/or the database system performing on a target platform 135. The system 100 may include or be used in combination with the servers 800 and 850 in FIGS. 8A and 8B. In one embodiment, the servers 800 and/or 850 may be alternative embodiments of the database systems 105 and/or 135.

As shown in FIG. 1, the system 100 includes a database system performing on a host platform 105. The system 100 includes an audit trail 110. The system 100 includes an apparatus 115. The apparatus 115 includes a replay engine 120, a capture engine 125, and an adaptation engine 130. The system 100 includes a database system performing on a target platform 135. In one embodiment, the system 100 is configured to compare performance indications across different platforms (e.g., host platform v. target platforms).

In one embodiment, without limitation, the database system performing on a host platform 105 may include OS 2200 (database system) that performs on Windows operating system (host platform). It is noted that the database system of 105 may be any database system not limited to OS 2200 and the host platform may be any operating system not limited to Windows.

In one embodiment, the details of the tasks performed in the database system 105 may be recorded in an audit trail 110. The information recoded may include the type of the task, the data involved in the task, starting time of a task, ending time of a task, the identity of the user conducting the task, or the like. The types of tasks being recorded by in the audit trail 110 may include read, write data, modify data, move data, copy data, delete data, record insertion into database, database record deletion, database record modification, adding database structure, deleting database structure, modifying database structure, database dump, database online and/or offline reorganization, database recovery, database quiesce, or the like.

In one embodiment, the audit trail 110 may be stored in a same server as the database system performing on a host platform 105. In another embodiment, the audit trail 110 may be stored in a magnetic tape. In another embodiment, the audit trail 110 may be stored in any suitable computer-readable medium.

In one embodiment, the apparatus 115 may have a processor executing the instructions implementing the replay engine 120, the capture engine 125, and the adaptation engine 130. In one embodiment, the apparatus may be an electronic circuit board and each of the replay engine 120, the capture engine 125, and the adaptation engine 130 is an integrated circuit (IC) mounted on the electronic circuit board sharing digital data with each other. In some other embodiments, each of the replay engine 120, capture engine 125, and adaptation engine 130 may be a separate apparatus (e.g., a computer, a server, a specialized controller, etc) having one or more processors. In yet some other embodiments, the replay engine 120, capture engine 125, and adaptation engine 130 may be instructions implementing the suitable functions. In some examples, the various embodiments of the apparatus 115 in FIG. 1 may be alternative embodiments of the method 200 in FIG. 2. In some examples, the various embodiments of the replay engine 120 in FIG. 1 may be alternative embodiments of the method implementing a replay engine 300 in FIG. 3. In some examples, the various embodiments of the capture engine 125 in FIG. 1 may be alternative embodiments of the method implementing a capture engine 400 in FIG. 4. In some examples, the various embodiments of the adaptation engine 130 in FIG. 1 may be alternative embodiments of the method implementing an adaptation engine 500 in FIG.

In one embodiment, without limitation, the database system performing on a target platform 135 may include OS 2200 (database system) that performs on Unix operating system (target platform). It is noted that the database system of 135 may be any database system not limited to OS 2200 and the host platform of 135 may be any operating system not limited to Unix.

Figure 2:
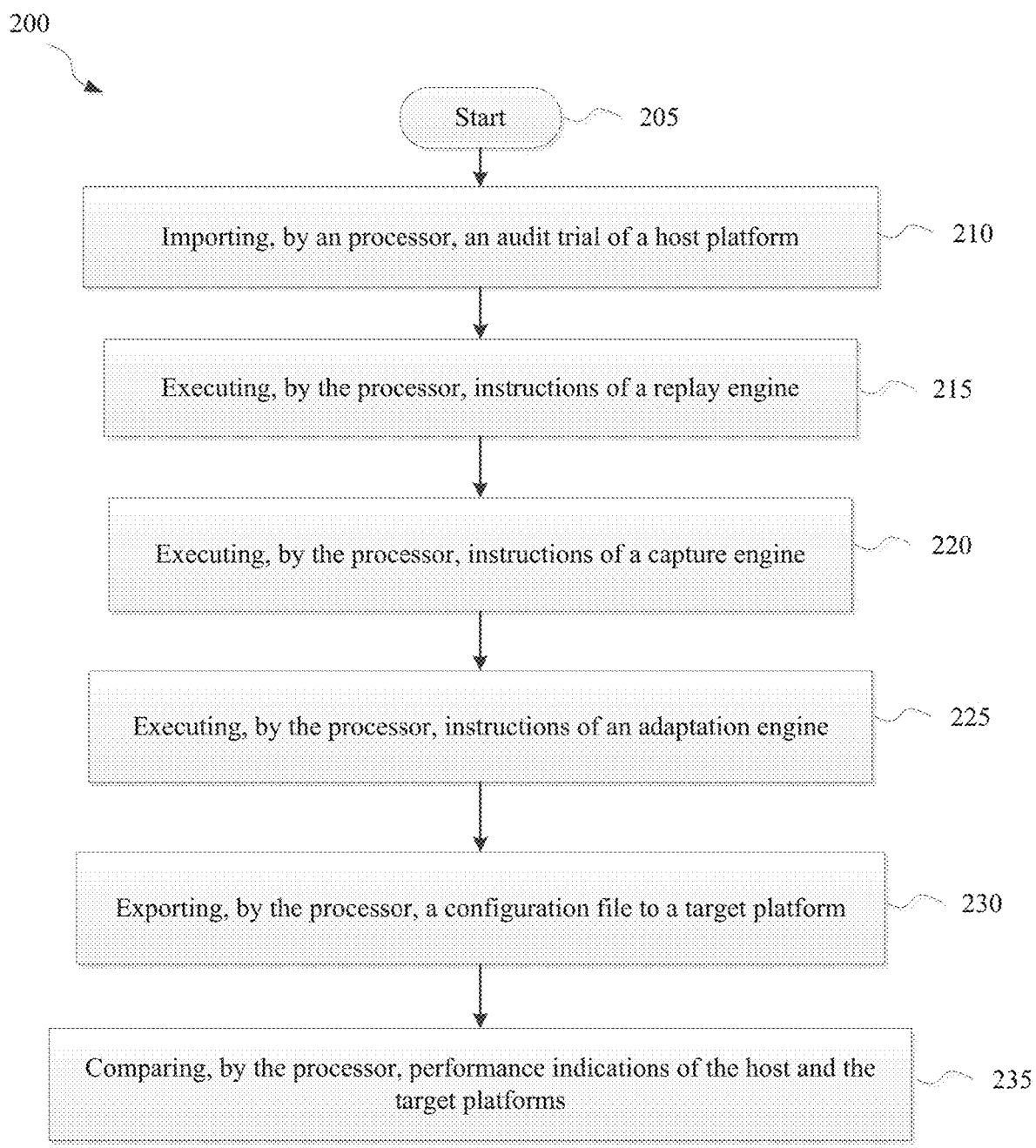
FIG. 2 is a flow chart illustrating a method comparing performance indications across different platforms according to one embodiment of the disclosure.

FIG. 2 is a flow chart illustrating a method 200 to compare performance indications across different platforms according to one embodiment of the disclosure. The method 200 may be implemented by the system 100 in FIG. 1. In one embodiment, the apparatus 115 may implement the method 200. The method 200 may include the method implementing a replay engine 300 in FIG. 3. In one embodiment, the method implementing a replay engine 300 may be an alternative embodiment of the replay engine at block 215. The method 200 may include the method implementing a capture engine 400 in FIG. 4. In one embodiment, the method implementing a capture engine 400 may be an alternative embodiment of the capture engine at block 220. The method 200 may include the method implementing an adaptation engine 500 in FIG. 5. In one embodiment, the method implementing an adaptation engine 500 may be an alternative embodiment of the adaptation engine at block 225. The method 200 may be implemented by the system 600 in FIG. 6. In one embodiment, the server 602 may include instructions implementing method 200. The method 200 may be implemented by the computer system 700 in FIG. 7. In one embodiment, the computer system 700 may implement the method 200. The method 200 may be implemented by the servers 800 and 850 in FIGS. 8A and 8B.

As shown in FIG. 2, the method 200 starts at block 205. The method 200 proceeds to block 210, which includes importing, by an processor, an audit trial of a host platform. The method 200 proceeds to block 215, which includes executing, by the processor, instructions of a replay engine. The method 200 proceeds to block 220, which includes executing, by the processor, instructions of ta capture engine. The method 200 proceeds to block 225, which includes executing, by the processor, instructions of an adaptation engine. The method 200 proceeds to block 230, which includes exporting, by the processor, a configuration file to a target platform. The method 200 proceeds to block 235, which includes comparing, by the processor, performance indications of the host and the target platforms.

At block 210, the method 200 imports an audit trait of a host platform. In one embodiment, the importation may include all information recorded in the audit trail. In another embodiment, the importation may include just a portion of the information (e.g., just the relevant part) recorded in the audit trail. The information recoded in the audit trail at block 210 may include the type of the task, the data involved in the task, starting time of a task, ending time of a task, the identity of the user conducting the task, or the like. The types of tasks recoded in the audit trail at block 210 may include read, write data, modify data, move data, copy data, delete data, record insertion into database, database record deletion, database record modification, adding database structure, deleting database structure, modifying database structure, database dump, database online and/or offline reorganization, database recovery, database quiesce, or the like.

At block 215, the method 200 executes instructions of a replay engine. In one embodiment at block 215, the replay engine may extract a complete or a portion of the database stored in the audit trial. In another embodiment at block 215, the replay engine may extract a complete or a portion of information of tasks recorded in the audit trail. In one embodiment at block 215, the replay engine may perform a replay of the tasks recorded in the audit trail. In one embodiment, the replay is a repeat of the tasks performed under a condition of a database then recorded in the audit trail. Depending on what information was extracted by the replay engine, the replay may be a full repeat of every tasks or just a portion of the tasks recorded in the audit trail.

At block 220, the method executes instructions of a capture engine. In one embodiment at block 220, the capture engine may create a database using a replay performed by the replay engine at 215. In one embodiment, the database created at 220 may include all information of the database of the replay. In another embodiment, the database created at 220 may include a portion of the database of the replay. In some embodiment at 220, the database may or may not include a database structure with a same number of columns and rows as the database of the replay.

In one embodiment at block 220, the capture engine may extract data from the replay. In one embodiment at 220, the capture engine may extract all or a portion of the data of the replay.

In one embodiment at block 220, the capture engine may store the data extracted from the replay to the database created. In one embodiment, the capture engine at 220 may store the extracted data to a column and row of the database created by the capture engine following the information shown in a replay.

In one embodiment at block 220, the capture engine may collect database attributes of the host platform. In one embodiment, the database attributes of the host platform collected at 220 may include database structure area size, number of areas, block size, audit file area size, number of records that can be populated to a database, number of buffers, memory resident, tuple storage related information, or the like.

In one embodiment at block 220, the capture engine may collect performance indications of the host platform from the replay. In some embodiment, the performance indications may include the time required to perform a task in a database performing on the host platform. In one embodiment, shorter time required for performing a task indicates better performances. In some embodiments at block 220, performance indications may be collected for tasks of read, write data, modify data, move data, copy data, delete data, record insertion into database, database record deletion, database record modification, adding database structure, deleting database structure, modifying database structure, database dump, database online and/or offline reorganization, database recovery, database quiesce, or the like.

In one embodiment at block 220, the capture engine may generate a capture file. In one embodiment, the capture file may include everything extracted by the capture engine from the replay. In one embodiment, a capture file may include a database created by the capture engine. In one embodiment, a capture file may include the data extracted by the capture engine. In another embodiment, a capture file may include the system information of the first platform. In yet another embodiment, capture file may include performance indications of the first platform.

At block 225, the method 200 executes instructions of an adaptation engine. In one embodiment at 225, the adaptation engine may import a capture file of the host platform. In one embodiment at 225, the adaptation engine may collect database attributes of a target platform. In another embodiment, at 225, the adaptation engine may generate a configuration file for the target platform.

At block 225, in one embodiment, the adaptation engine may generate a configuration file, wherein the configuration file may be configured for comparing platform performances by performing same or similar tasks across platforms.

For example, in one embodiment, the configuration file may allow the target platform to perform same or similar tasks that were previously performed on the host platform. By performing same or similar tasks, the performance indications of the target platform may be collected and compared with the host platform.

At block 230, the method 200 exports a configuration file to a target platform.

At block 235, the method 200 compares performance indications of the host and the target platforms.

Figure 3:
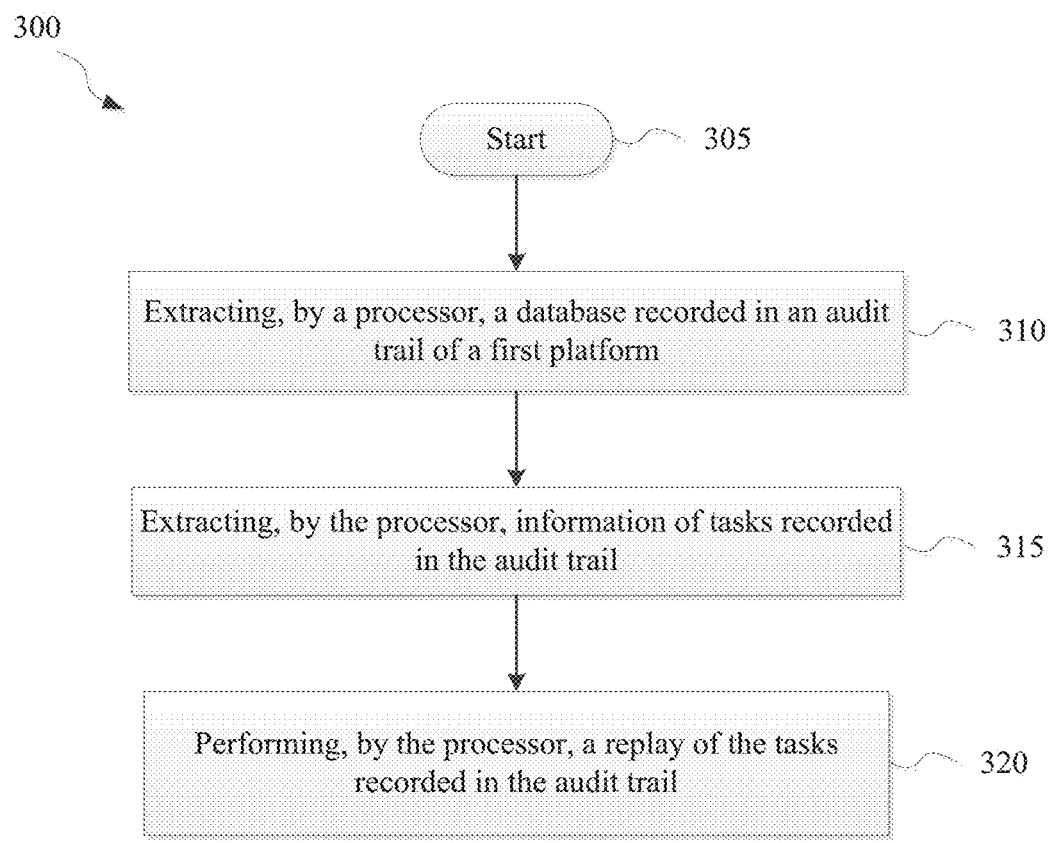
FIG. 3 is a flow chart illustrating a method implementing a replay engine according to one embodiment of the disclosure.

FIG. 3 is a flow chart illustrating a method implementing a replay engine 300 according to one embodiment of the disclosure. The method implementing a replay engine 300 may be implemented by the system 100 in FIG. 1. In one embodiment, the apparatus 115 may include the method implementing a replay engine 300. The method implementing a replay engine 300 may be included in the method 200 in FIG. 2. In one embodiment, the method implementing a replay engine 300 may be an alternative embodiment of the replay engine at block 215. The method implementing a replay engine 300 may be used in combination with the method implementing a capture engine 400 in FIG. 4. The method implementing a replay engine 300 may be used in combination with the method implementing an adaptation engine 500 in FIG. 5. The method implementing a replay engine 300 may be implemented by the system 600 in FIG. 6. In one embodiment, the server 602 may include instructions implementing the method 300. The method implementing a replay engine 300 may be implemented by the computer system 700 in FIG. 7. In one embodiment, the computer system 700 may include instructions implementing the method 300. The method implementing a replay engine 300 may be implemented by the servers 800 and/or 850 in FIGS. 8A and 8B. In some embodiments, the servers 800 and/or 850 may include instructions implementing the method 300.

The method 300 starts at block 305. The method 300 proceeds to block 310, which includes extracting, by a processor, a database recorded in an audit trail of a first platform. The method 300 proceeds to block 315, which includes extracting, by the processor, information of tasks recorded in the audit trail. The method 300 proceeds to block 320, which includes performing, by the processor, a replay of the tasks recorded in the audit trail.

At block 310, the method extracts a database recorded in an audit trail of a first platform. In one embodiment at block 310, the method 300 may extract a complete or a portion of the database stored in the audit trial.

At block 315, the method extracts information of tasks recorded in the audit trail. In another embodiment at block 315, the method 300 may extract a complete or a portion of information of tasks recorded in the audit trail. In some embodiments, at block 315, the information of tasks recoded in the audit trail may include the type of the task, the data involved in the task, starting time of a task, ending time of a task, the identity of the user conducting the task, or the like. The types of tasks being recorded in the audit trail at 315 may include read, write data, modify data, move data, copy data, delete data, record insertion into database, database record deletion, database record modification, adding database structure, deleting database structure, modifying database structure, database dump, database online and/or offline reorganization, database recovery, database quiesce, or the like.

At block 320, the method performs a replay of the tasks recorded in the audit trail. In one embodiment, the replay is a repeat of the tasks performed under a condition of a database then recorded in the audit trail. In some embodiments, depending on what information was extracted by the replay engine, the replay may be a full repeat of every tasks or just a portion of the tasks recorded in the audit, trail.

At block 320, the replay performed by the method 300 may be used by a capture engine, e.g., the capture engine 125, the capture engine at 220, and the method 400, to create a capture file.

Figure 4:
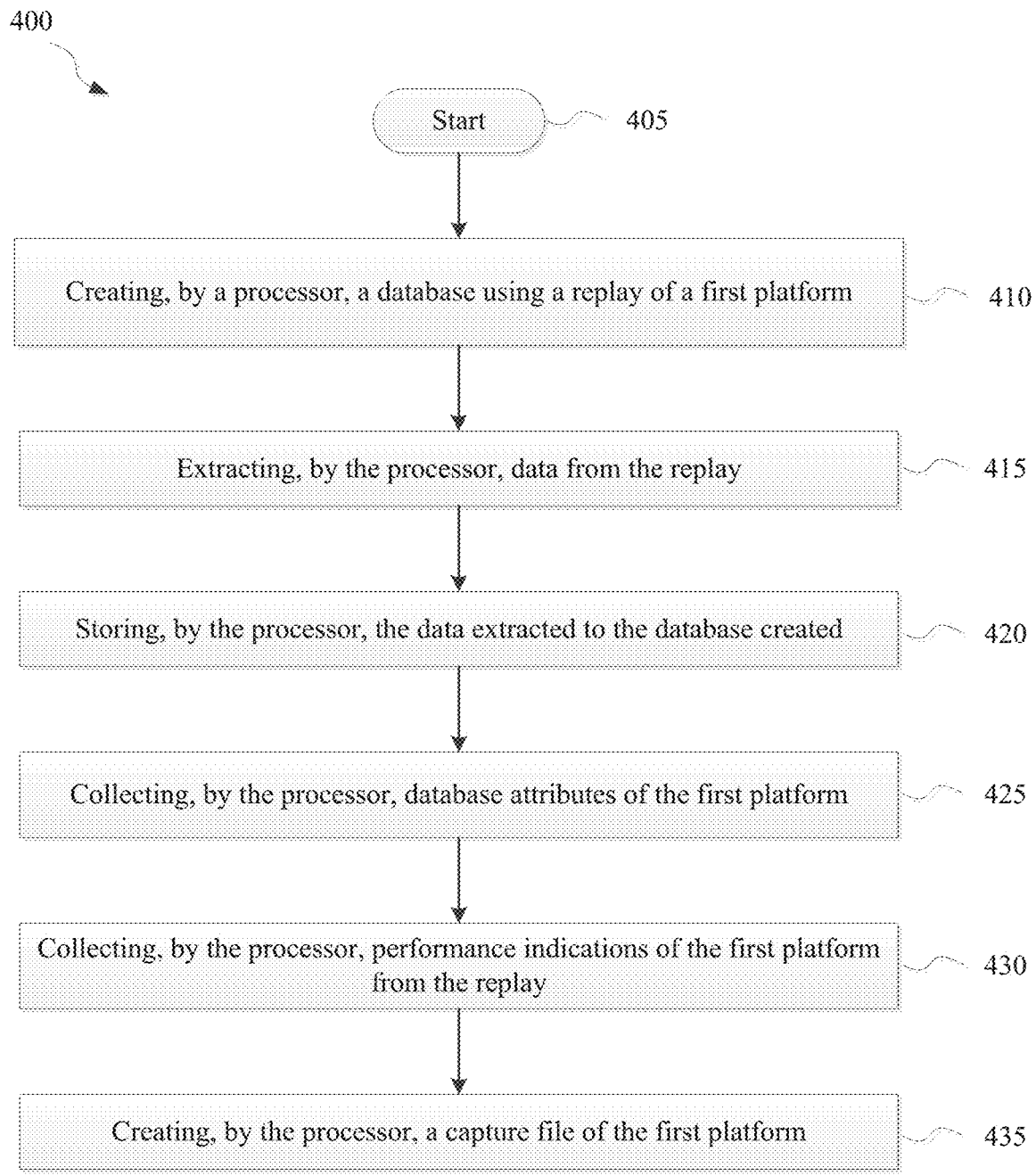
FIG. 4 is a flow chart illustrating a method implementing a capture engine according to one embodiment of the disclosure.

FIG. 4 is a flow chart illustrating a method implementing a capture engine 400 according to one embodiment of the disclosure. The method implementing a capture engine 400 may be implemented by the system 100 in FIG. 1. In one embodiment, the apparatus 115 may include the method implementing a capture engine 400. The method implementing a capture engine 400 may be included in the method 200 in FIG. 2. In one embodiment, the method implementing a capture engine 400 may be an alternative embodiment of the replay engine at block 220. The method implementing a capture engine 400 may be used in combination with the replay engine 300 in FIG. 3. The method implementing a capture engine 400 may be used in combination with the method implementing an adaptation engine 500 in FIG. 5. The method implementing a capture engine 400 may be implemented by the system 600 in FIG. 6. In one embodiment, the server 602 may include instructions implementing the method implementing a capture engine 400. The method implementing a capture engine 400 may be implemented by the computer system 700 in FIG. 7. In one embodiment, the computer system 700 may include instructions implementing the method 400. The method implementing a capture engine 400 may be implemented by the servers 800 and/or 850 in FIGS. 8A and 8B. In some embodiments, the servers 800 and/or 850 may include instructions implementing the method 400.

As shown in FIG. 4, the method implementing a capture engine 400 starts at block 405. The method 400 proceeds to block 410, which includes creating, by a processor, a database using a replay of a first platform. The method 400 proceeds to block 415, which includes extracting, by the processor, data from the replay. The method 400 proceeds to block 420, which includes storing, by the processor, the data extracted to the database created. The method 400 proceeds to block 425, which includes collecting, by the processor, database attributes of the first platform. The method 400 proceeds to block 430, which includes collecting, by the processor, performance indications of the first platform from the replay. The method 400 proceeds to block 435, which includes creating, by the processor, a capture file of the first platform.

At block 410, the method creates a database using a replay of a first platform. In one embodiment, the first platform may be a host platform. In one embodiment, the replay at 410 may be the replay performed by the method 300 at block 320.

It is noted that the database created by method 400 at block 410 may be separate from a database contained in the replay and/or recorded in the audit trail of which the replay is generated. In one embodiment, the database created at 410 may include all information of a database of the replay. In another embodiment, the database created at 410 may include a portion of the database of the replay. In some embodiment at 410, the database may or may not include a database structure with a same number of columns and rows as a database of the replay. In one embodiment, the method 400 may only extract, the components in the replay necessary for the intended application.

At block 415, the method 400 extracts data from the replay. In one embodiment of 415, the method 400 may extract all or a portion of the data of the replay. At 415, the data may be numbers, characters, symbols, etc.

At block 420, the method 400 stores the data extracted to the database created. In one embodiment, the method 400 at block 420 may store the extracted data to a column and row of the database created at 410 according to the information shown in a replay.

At block 425, the method 400 collects database attributes of the first platform. In one embodiment, the database attributes of the first platform collected at 425 may include database structure area size, number of areas, block size, audit file area size, number of records that can be populated to a database, number of buffers, memory resident, tuple storage related information, or the like.

At block 430, the method 400 collects performance indications of the first platform form the replay. In some embodiment, the performance indications may include the time required to perform a task in a database performing on the host platform. In one embodiment, a shorter time required for performing a specific task indicates better performances. In some embodiments at block 220, performance indications may be collected for tasks of read, write data, modify data, move data, copy data, delete data, record insertion into database, database record deletion, database record modification, adding database structure, deleting database structure, modifying database structure, database dump, database online and/or offline reorganization, database recovery, database quiesce, or the like.

At block 435, the method 400 creates a capture file of the first platform. In one embodiment, the capture file may include everything extracted by the capture engine from the replay. In one embodiment, a capture file may include a database created by the capture engine, in one embodiment, a capture file may include the data extracted by the capture engine. In another embodiment, a capture file may include the system information of the first platform. In yet another embodiment, capture file may include performance indications of the first platform.

Figure 5:
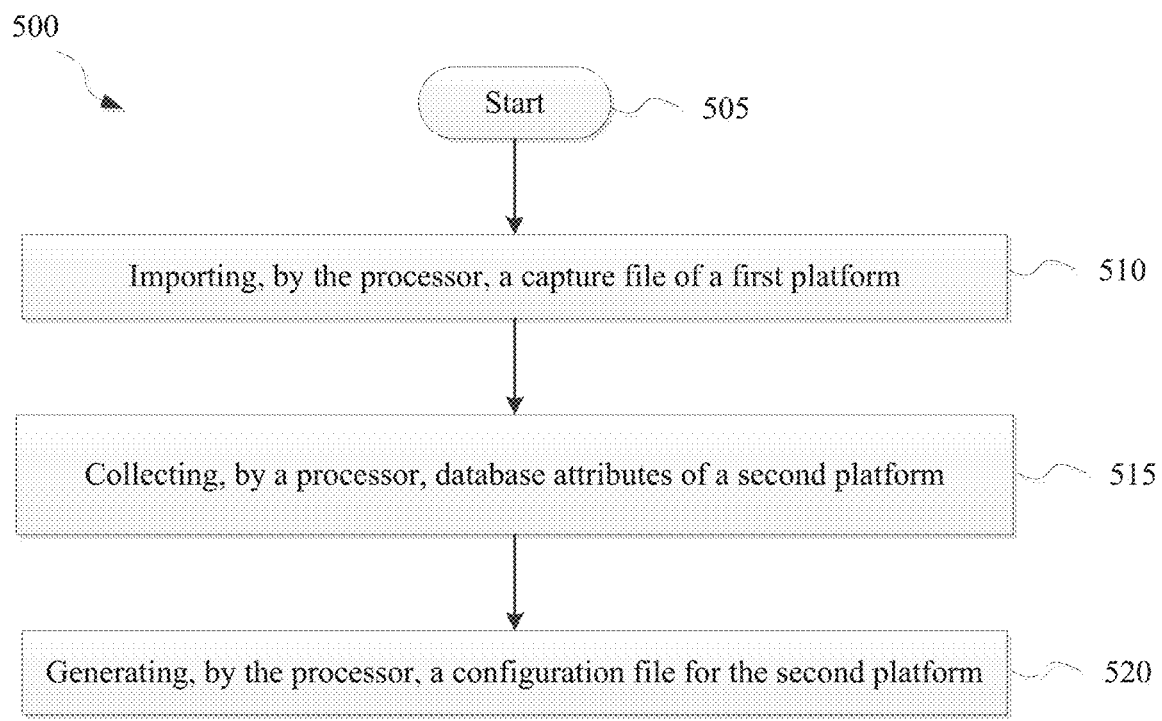
FIG. 5 is a flow chart illustrating a method implementing an adaptation engine according to one embodiment of the disclosure.

FIG. 5 is a flow chart illustrating a method implementing an adaptation engine 500 according to one embodiment of the disclosure. The method implementing an adaptation engine 500 may be implemented by the system 100 in FIG. 1. In one embodiment, the apparatus 115 may include the method implementing an adaptation engine 500. The method implementing an adaptation engine 500 may be included in the method 200 in FIG. 2. In one embodiment, the method implementing an adaptation engine 500 may be an alternative embodiment of the adaptation engine at block 225. The method implementing an adaptation engine 500 may be used in combination with the method implementing a replay engine 300 in FIG. 3. The method implementing an adaptation engine 500 may be used in combination with the method implementing a capture engine 400 in FIG. 4. The method implementing an adaptation engine 500 may be implemented by the system 600 in FIG. 6. In one embodiment, the server 602 may include instructions implementing the method 500. The method implementing an adaptation engine 500 may be implemented by the computer system 700 in FIG. 7. In one embodiment, the computer system 700 may include instructions implementing the method 500. The method implementing an adaptation engine 500 may be implemented by the servers 800 and/or 850 in FIGS. 8A and 8B. In some embodiments, the servers 800 and/or 850 may include instructions implementing the method 500.

As shown in FIG. 5, the method implementing an adaptation engine 500 starts at block 505. The method 500 proceeds to block 510, which includes importing, by the processor, a capture file of a first platform. The method 500 proceeds to block 515, which includes collecting, by the processor, database attributes of a second platform. The method 500 proceeds to block 520, which includes generating, by the processor, a configuration file for the second platform.

At block 510, the method 500 imports a capture file of a first platform. In one embodiment, the capture file may be generated by method 400 at block 435. In one embodiment, the first platform may be a host platform.

At block 515, the method 500 collects database attributes of a second platform. In one embodiment, the second platform may be a target platform.

At block 520, the method 500 generates a configuration file for the second platform. In one embodiment, the second platform may be a target platform. In one embodiment, the configuration file may be configured for comparing platform performances by performing same or similar tasks across platforms.

For example, in one embodiment, the configuration file may allow the target platform to perform same or similar tasks that were previously performed on the host platform. By performing same or similar tasks, the performance indications of the target platform may be collected and compared with the host platform.

In some embodiments, the tasks being compared across platforms (e.g., first platform v. second platform or host platforms v. target platform) may include read, write data, modify data, move data, copy data, delete data, record insertion into database, database record deletion, database record modification, adding database structure, deleting database structure, modifying database structure, database dump, database online and/or offline reorganization, database recovery, database quiesce, or the like.

Figure 6:
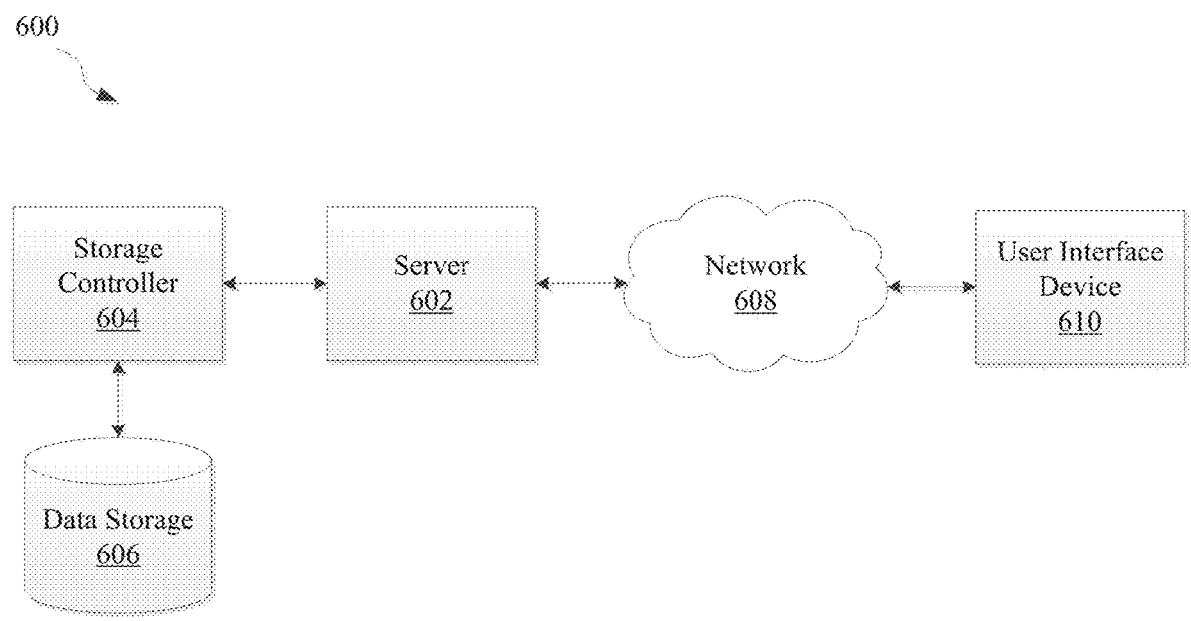
FIG. 6 is a block diagram illustrating a system according to one embodiment of the disclosure according to one embodiment of the disclosure.

FIG. 6 is a block diagram illustrating a system 600 according to one embodiment of the disclosure according to one embodiment of the disclosure. FIG. 6 illustrates a system 600 for obtaining access to database files in a computing system according to one embodiment of the disclosure. The system 600 may include a server 602, a data storage device 606, a network 608, and an user interface device 610. The server 602 may also be a hypervisor-based system executing one or more guest partitions hosting operating systems with modules having server configuration information. In a further embodiment, the system 600 may include a storage controller 604, or a storage server configured to manage data communications between the data storage device 606 and the server 602 or other components in communication with the network 608. In an alternative embodiment, the storage controller 604 may be coupled to the network 608.

In one embodiment, the user interface device 610 is referred to broadly and is intended to encompass a suitable processor-based device such as a desktop computer, a laptop computer, a personal digital assistant (PDA) or tablet computer, a smartphone or other mobile communication device having access to the network 608. In a further embodiment, the user interface device 610 may access the Internet or other wide area or local area network to access a web application or web service hosted by the server 602 and may provide an user interface for enabling an user to enter or receive information.

The network 608 may facilitate communications of data between the server 602 and the user interface device 610. The network 608 may include any type of communications network including, but not limited to, a direct PC-to-PC connection, a local area network (LAN), a wide area network (WAN), a modem-to-modem connection, the Internet, a combination of the above, or any other communications network now known or later developed within the networking arts which permits two or more computers to communicate.

In one embodiment, the user interface device 610 accesses the server 602 through an intermediate sever (not shown). For example, in a cloud application the user interface device 610 may access an application server. The application server fulfills requests from the user interface device 610 by accessing a database management system (DBMS). In this embodiment, the user interface device 610 may be a computer or phone executing a Java application making requests to a JBOSS server executing on a Linux server, which fulfills the requests by accessing a relational database management system (RDMS) on a mainframe server.

Figure 7:
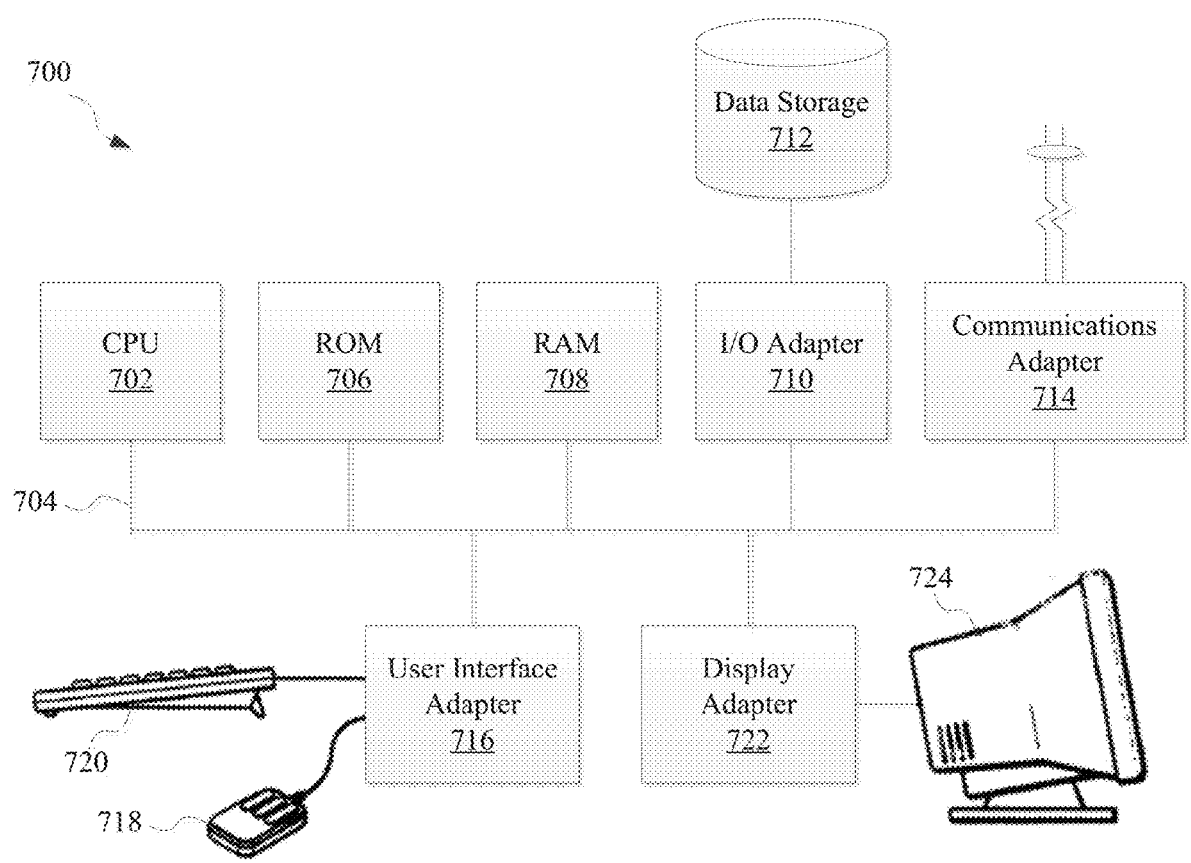
FIG. 7 is a block diagram illustrating a computer system according to one embodiment of the disclosure.

FIG. 7 is a block diagram illustrating a computer system 700 according to one embodiment of the disclosure. FIG. 7 illustrates a computer system 700 adapted according to certain embodiments of the server 602 and/or the user interface device 610. The central processing unit ("CPU") 702 is coupled to the system bus 704. The CPU 702 may be a general purpose CPU or microprocessor, graphics processing unit ("GPU"), and/or microcontroller. The present embodiments are not restricted by the architecture of the CPU 702 so long as the CPU 702, whether directly or indirectly, supports the operations as described herein. The CPU 702 may execute the various logical instructions according to the present embodiments.

The computer system 700 may also include random access memory (RAM) 708, which may be synchronous RAM (SRAM), dynamic RAM (DRAM), synchronous dynamic RAM (SDRAM), or the like. The computer system 700 may utilize RAM 708 to store the various data structures used by a software application. The computer system 700 may also include read only memory (RUM) 706 which may be PROM, EPROM, EEPROM, optical storage, or the like. The ROM may store configuration information for booting the computer system 700. The RAM 708 and the ROM 706 hold user and system data, and both the RAM 808 and the ROM 706 may be randomly accessed.

The computer system 700 may also include an I/O adapter 710, a communications adapter 714, an user interface adapter 716, and a display adapter 722. The I/O adapter 710 and/or the user interface adapter 716 may, in certain embodiments, enable an user to interact with the computer system 700. In a further embodiment, the display adapter 722 may display a graphical user interface (GUI) associated with a software or web-based application on a display device 724, such as a monitor or touch screen.

The I/O adapter 710 may couple one or more storage devices 712, such as one or more of a hard drive, a solid state storage device, a flash drive, a compact disc (CD) drive, a floppy disk drive, and a tape drive, to the computer system 700. According to one embodiment, the data storage 712 may be a separate server coupled to the computer system 700 through a network connection to the I/O adapter 710. The communications adapter 714 may be adapted to couple the computer system 700 to the network 608, which may be one or more of a LAN, WAN, and/or the Internet. The user interface adapter 716 couples user input devices, such as a keyboard 720, a pointing device 718, and/or a touch screen (not shown) to the computer system 700. The display adapter 722 may be driven by the CPU 702 to control the display on the display device 724. Any of the devices 702-722 may be non-emulated and/or emulated.

The applications of the present disclosure are not limited to the architecture of computer system 700. Rather the computer system 700 is provided as an example of one type of computing device that may be adapted to perforin the functions of the server 602 and/or the user interface device 710. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art, may utilize any number of suitable structures capable of executing logical operations according to the described embodiments. For example, the computer system 800 may be virtualized for access by multiple users and/or applications.

Figure 8A:
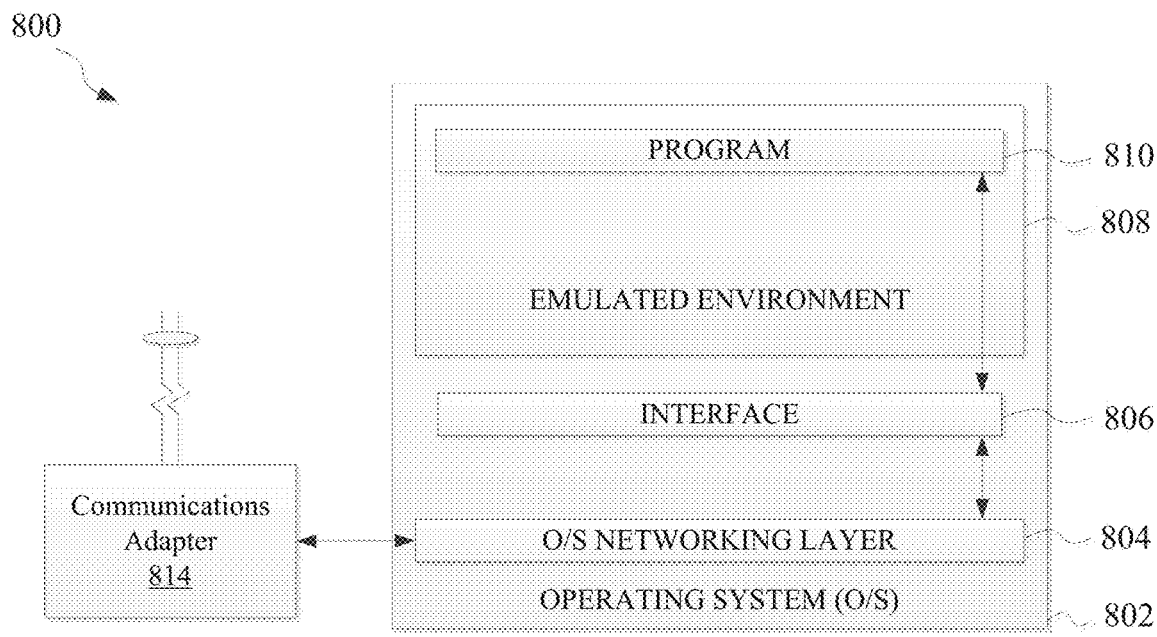
FIG. 8A is a block diagram illustrating a server hosting an emulated software environment for virtualization according to one embodiment of the disclosure.

FIG. 8A is a block diagram illustrating a server 800 hosting an emulated software environment for virtualization according to one embodiment of the disclosure. An operating system 802 executing on a server 800 includes drivers for accessing hardware components, such as a networking layer 804 for accessing the communications adapter 814. The operating system 802 may be, for example, Linux or Windows. An emulated environment 808 in the operating system 802 executes a program 810, such as Communications Platform (CPComm) or Communications Platform for Open Systems (CPCommOS). The program 810 accesses the networking layer 804 of the operating system 802 through a non-emulated interface 806, such as extended network input output processor (XNIOP). The non-emulated interface 806 translates requests from the program 810 executing in the emulated environment 808 for the networking layer 804 of the operating system 802.

Figure 8B:
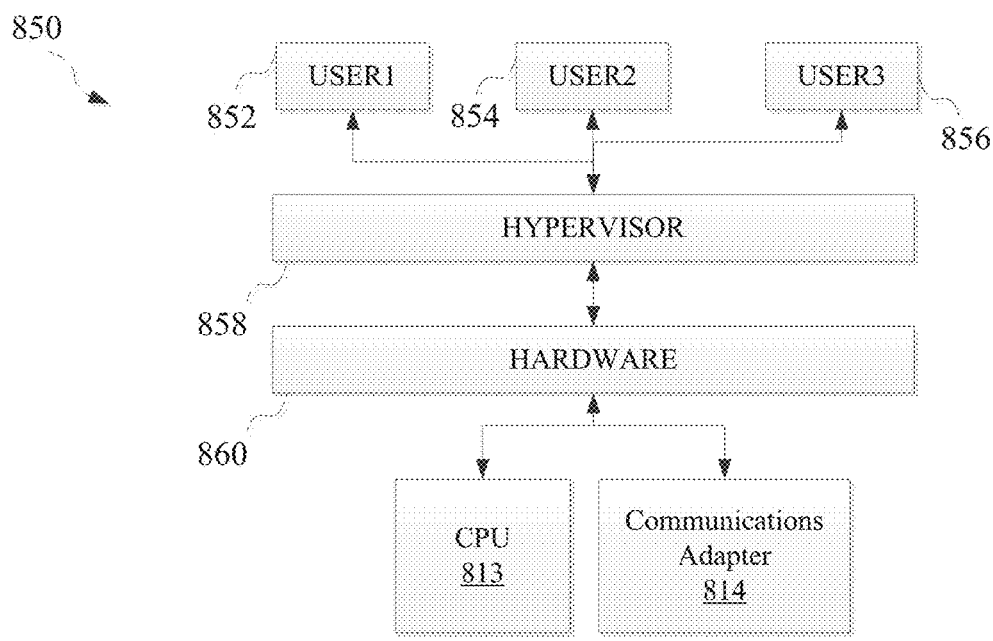
FIG. 8B is a block diagram illustrating a server hosing an emulated hardware environment according to one embodiment of the disclosure.

In another example, hardware in a computer system may be virtualized through a hypervisor. FIG. 8B is a block diagram illustrating a server 850 hosting an emulated hardware environment according to one embodiment of the disclosure. Users 852, 854, 856 may access the hardware 860 through a hypervisor 858. The hypervisor 858 may be integrated with the hardware 858 to provide virtualization of the hardware 858 without an operating system, such as in the configuration illustrated in FIG. 8A. The hypervisor 858 may provide access to the hardware 858, including the CPU 813 and the communications adaptor 814.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A computer implemented method for comparing performance of a database running on multiple virtual processing devices having different operating systems, the computer implemented method comprising:

importing, by a processor, an audit trail of a first virtual processing system having a first operating system executing on a host platform;

executing, by the processor, instructions of a replay engine executed on the first virtual processing system having the first operating system;

executing, by the processor, instructions of a capture engine executed on the first virtual processing system having the first operating system, wherein the capture engine recreates a database based on a replay of the audit trial, the database recreated is the same as a database existed in the replay of the audit trial;

executing, by the processor, instructions of an adaptation engine executed on the first virtual processing system having the first operating system;

exporting, by the processor, a configuration file to a second virtual processing system having a second operating system executing on a target platform; and comparing, by the processor, performance indications of the host and the target platforms, wherein the performance indications comprise a time required to perform a respective task in the database performing on a respective platform;

wherein the host platform and the target platform are the same physical processing system.

2. The computer implemented method of claim 1, wherein the replay engine further includes:

extracting, by the processor, a database recorded in the audit trail;

extracting, by the processor, information of tasks recorded in the audit trail; and performing, by the processor, a replay of the tasks recorded in the audit trail.

3. The computer implemented method of claim 1, wherein the capture engine further includes:

creating, by the processor, a database using a replay of the host platform;

collecting, by the processor, database attributes of the host platform; and collecting, by the processor, performance indications of the host platform from the replay.

4. The computer implemented method of claim 1, wherein the capture engine further includes creating, by the processor, a capture file of the host platform.

5. The computer implemented method of claim 1, wherein the adaptation engine further includes:

importing, by the processor, a capture file of the host platform; and collecting, by the processor, database attributes of a target platform.

6. The computer implemented method of claim 1, wherein the adaptation engine further includes generating, by the processor, a configuration file for a target platform.

7. A computer program product, comprising:

a non-transitory computer-readable medium comprising instructions which, when executed by a processor of a computing system, cause the processor to perform compare performance of a database running on multiple virtual processing devices having different operating systems, the steps of:

importing an audit trail of a first virtual processing system having a first operating system executing on a host platform;

executing instructions of a replay engine executed on the first virtual processing system having the first operating system;

executing instructions of a capture engine executed on the first virtual processing system having the first operating system, wherein the capture engine recreates a database based on a replay of the audit trial, the database recreated is the same as a database existed in the replay of the audit trial;

executing instructions of an adaptation engine executed on the first virtual processing system having the first operating system;

exporting a configuration file to a second virtual processing system having a second operating system executing on a target platform; and comparing performance indications of the host and the target platforms, wherein the performance indications comprise a time required to perform a respective task in the database performing on a respective platform;

wherein the host platform and the target platform are the same physical processing system.

8. The computer program product of claim 7, wherein the replay engine further includes:

extracting a database recorded in the audit trail;

extracting information of tasks recorded in the audit trail; and performing a replay of the tasks recorded in the audit trail.

9. The computer program product of claim 7, wherein the capture engine further includes:

creating a database using a replay of the host platform;

collecting database attributes of the host platform; and collecting performance indications of the host platform from the replay.

10. The computer program product of claim 7, wherein the capture engine further includes creating a capture file of the host platform.

11. The computer program product of claim 7, wherein the adaptation engine further includes:

importing a capture file of the host platform; and collecting database attributes of a target platform.

12. The computer program product of claim 7, wherein the adaptation engine further includes generating a configuration file for a target platform.

13. An apparatus for comparing performance of a database running on multiple virtual processing devices having different operating systems, the apparatus, comprising:

a memory; and a processor coupled to the memory, the processor configured to execute the steps of:

importing an audit trail of a first virtual processing system having a first operating system executing on a host platform;

executing instructions of a replay engine executed on a first virtual processing system having a first operating system;

executing instructions of a capture engine executed on the first virtual processing system having the first operating system, wherein the capture engine recreates a database based on a replay of the audit trial, the database recreated is the same as a database existed in the replay of the audit trial;

executing instructions of an adaptation engine executed on the first virtual processing system having the first operating system;

exporting a configuration file to a second virtual processing system having a second operating system executing on a target platform; and comparing performance indications of the host and the target platforms, wherein the performance indications comprises a time required to perform a respective task in the database performing on a respective platform.

14. The apparatus of claim 13, wherein the replay engine further includes:

extracting a database recorded in the audit trail;

extracting information of tasks recorded in the audit trail; and performing a replay of the tasks recorded in the audit trail.

15. The apparatus of claim 13, wherein the capture engine further includes:

creating a database using a replay of the host platform;

collecting database attributes of the host platform; and collecting performance indications of the host platform from the replay.

16. The apparatus of claim 13, wherein the capture engine further includes creating a capture file of the host platform.

17. The apparatus of claim 13, wherein the capture engine further includes:

importing a capture file of the host platform; and collecting database attributes of a target platform.

* * * * *